United States Patent

Desborough et al.

[11] Patent Number: 5,658,534
[45] Date of Patent: Aug. 19, 1997

[54] SONOCHEMICAL APPARATUS

[75] Inventors: Colin Leonard Desborough, Faringdon; Roger Barrie Pike, Newbury; Lawrence David Ward, Stanford-in-the-Vale, all of United Kingdom

[73] Assignee: AEA Technology PLC, Harwell, United Kingdom

[21] Appl. No.: 170,630

[22] Filed: Dec. 21, 1993

Related U.S. Application Data

[63] Continuation of Ser. No. 666,648, Mar. 8, 1991, abandoned.

[30] Foreign Application Priority Data

Mar. 28, 1990 [GB] United Kingdom ............... 9006989

[51] Int. Cl.[6] ......................................... B06B 1/00
[52] U.S. Cl. ............. 422/128; 204/157.15; 204/157.42; 204/157.62; 310/328; 367/152; 367/157; 367/159; 367/165; 367/173; 422/127
[58] Field of Search ......................... 427/127, 128; 40/328; 204/157.15, 157.42, 157.62; 367/152, 157, 159, 165, 173

[56] References Cited

U.S. PATENT DOCUMENTS

| | | | |
|---|---|---|---|
| 3,113,287 | 12/1963 | Renner | 367/165 |
| 3,331,589 | 7/1967 | Hammitt . | |
| 3,525,606 | 8/1970 | Bodine | 422/127 |
| 3,587,669 | 6/1971 | Vabo et al. | 422/127 |
| 3,771,117 | 11/1973 | Shaffer et al. | 367/165 |
| 3,800,275 | 3/1974 | Hagemann | 367/165 |
| 4,001,765 | 1/1977 | Sims | 367/152 |
| 4,074,152 | 2/1978 | Asai et al. . | |
| 4,369,100 | 1/1983 | Sawyer | 204/157.51 |
| 4,433,916 | 2/1984 | Hall . | |
| 4,694,440 | 9/1987 | Ogura et al. | 367/152 |
| 4,821,838 | 4/1989 | Chen | 367/152 |

FOREIGN PATENT DOCUMENTS 342446  11/1989  European Pat. Off. .

OTHER PUBLICATIONS

Suslick et al, "Chem. Dosimetry of Ultrasonic Cavitation," *Ultrasonics Symposium*, Proceedings 1981, IEEE, Chicago, IL.

Primary Examiner—Timothy M. McMahon
Attorney, Agent, or Firm—William R. Hinds

[57] ABSTRACT

A liquid is subjected to ultrasound within a stainless steel pipe (35) of wall thickness 2.5 mm. Three ultrasonic transducers (56) are equally spaced around the pipe, each fixed to one end of a tapered resonant coupler (46) with a nodal flange (48) by which it is supported with its wider end coaxially within a steel collar (38) welded to the outside of the pipe wall. The space around the sides and the end of the coupler is filled by a buffer liquid such as olive oil. When the transducers (56) are energised they resonate, as do the couplers (46), and ultrasound is transmitted through the buffer liquid and the wall into the liquid inside the pipe (35). Within the pipe the intensity can be sufficient to cause cavitation, and so to cause sonochemical effects.

2 Claims, 3 Drawing Sheets

SONOCHEMICAL APPARATUS

This is a continuation of application Ser. No. 07/666,648 filed Mar. 8, 1991 now abandoned.

This invention relates to apparatus for subjecting a liquid to a high ultrasonic intensity, particularly but not exclusively for inducing or enhancing a chemical reaction in the liquid.

If a liquid is subjected to a high ultrasonic intensity (that is an intensity greater than about 1 W/cm$^2$) then there is a significant deposition of energy into the liquid through attenuation and non-linear effects. This may lead to physical changes (for example streaming, mixing, or emulsification) or to chemical changes, and the present invention is principally concerned with the latter, which may be referred to as sonochemistry. The most significant sonochemical effects are usually associated with cavitation in the liquid, that is the creation of bubbles of gas or vapour due to the ultrasound and their subsequent collapse, and especially with transient vaporous cavitation which only occurs above an intensity threshold typically above 0.3 W/cm$^2$. This involves the creation of bubbles smaller than the resonant size (which depends on the frequency) and filled with vapour, which grow as the pressure falls through the rarefaction half-cycle of the ultrasonic wave and then collapse rapidly. Temperature transients of thousands of degrees and shock waves of hundreds of atmospheres are produced over volumes a few tens to hundreds of microns across. Transient cavitation can produce severe mechanical erosion of solid surfaces, and can induce chemical changes.

According to the present invention there is provided an apparatus for subjecting a liquid to a high ultrasonic intensity comprising means defining a chamber for the liquid, at least one collar fixed to the outside of a wall of the chamber, each collar enclosing part of an ultrasonic coupler adapted to resonate at an operating frequency and having a nodal flange by which it is fixed to the end of the collar remote from the wall such that there is a gap between the sides of the coupler and the collar, and a gap between the end of the coupler and the wall, a low attenuation buffer liquid with a cavitation threshold above that of the liquid in the chamber filling the collar and so occupying the gaps between the coupler and both the collar and the wall, and a transducer assembly fixed to the end of the coupler outside the collar adapted when energised to generate ultrasonic waves of the operating frequency in the coupler.

The benefits of mounting the transducer and the coupler by means of a nodal flange are that the resonant responses of the means defining the chamber have a minimal effect on the resonant behaviour of the transducer, and that the ultrasonic waves are transmitted into the coupler and then through the buffer liquid and the wall into the liquid in the chamber, rather than into the means defining the chamber. The use of a buffer liquid enables cavitation and hence erosion at the end of the coupler to be suppressed, while the presence of a collar surrounding the part of the coupler immersed in buffer liquid suppresses lateral modes of vibration in the coupler.

Desirably the coupler is half a wavelength long (at the operating frequency), is of titanium alloy, and along part of its length is tapered. There is preferably no change in diameter between opposite sides of the nodal flange. In a preferred embodiment the end adjacent to the wall is of diameter 50 mm while the other end is of diameter 33 mm. The wall itself may be of glass, or stainless steel and in this case is preferably less than 5 mm thick, most preferably 2.5 mm thick, to improve transmission of ultrasound into the liquid in the chamber.

The collar is desirably of such a length that the gap between the end of the coupler and the nearest part of the wall is less than 10 mm and much less than a quarter wavelength in the buffer liquid, preferably about 6 mm. The gap between the sides of the coupler and the collar is preferably less than 10 mm, but preferably no less than 2 mm. The collar itself is desirably between 2 and 5 mm thick, preferably about 3 mm thick, and of stainless steel.

The preferred buffer liquid is olive oil. Means are preferably provided to circulate the buffer liquid and to cool it, as there is significant heat generation in the coupler and in the buffer liquid during operation.

Preferably the chamber-defining means comprises a cylindrical stainless-steel tube, and there are three such collars fixed to the outside equally spaced around it, lying in a common plane. The tube might be closed at each end to define a closed chamber, or might form part of a longer duct, for example a reaction loop connected at each end to a larger storage vessel. Desirably the wall to which the collar is fixed is integral with the means defining the chamber for example the wall would desirably be an integral part of the tube defining the chamber, so there is no need for any seal between the buffer liquid in the collar and the liquid in the chamber.

BRIEF DESCRIPTION OF THE DRAWINGS

The invention will now be further described by way of example only, and with reference to the accompanying drawings, in which:

Referring to FIG. 1 there is shown a chemical treatment plant 10 including a reactor tank 12 provided with a heating and/or cooling jacket 13, internal baffles 14, a stirrer 15 driven by a motor 16, inlets 17 and 18 for reagents and an outlet 19 for a product. A loop 20 communicates between two ports 21, 22 in the tank 12, and incorporates a pump 24 so liquids from the tank 12 may be circulated through the loop 20. A sonochemical apparatus 25 (shown diagrammatically) forms part of the loop 20, and can be isolated by valves 26. The apparatus 25 includes a collar 28 filled with olive oil; the oil is circulated by a pump 27 through a heat exchanger 29 during operation, the circuit including an expansion tank 30 covered by a flexible membrane 31 to ensure the oil does not become contaminated for example by water vapour.

Figure 1:
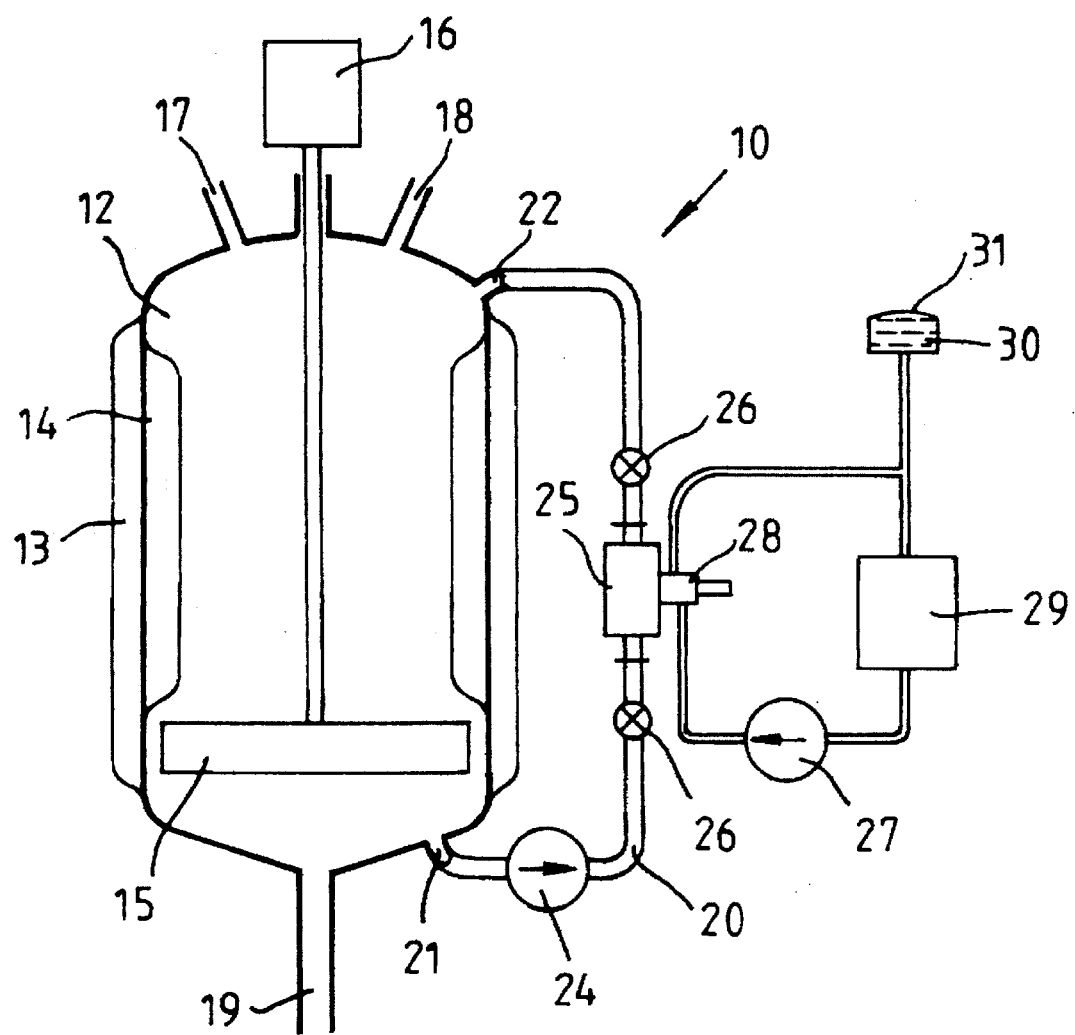
FIG. 1 shows a diagrammatic partly sectional view of a plant including a sonochemical apparatus.

It will be understood that the liquid being passed through the sonochemical apparatus 25 might be a single phase for example a mixture of water-soluble reactants in water, or might be more than one phase, for example a mixture of two or more immiscible liquids, or particulate matter in suspension. It will also be appreciated that the plant 10 might incorporate more than one loop 20 connected to the tank 12, so the flows of liquid in the loops 20 are in parallel; also, within any one loop 20 there might be more than one sonochemical apparatus 25 through which the liquid would flow in series.

Figure 2:
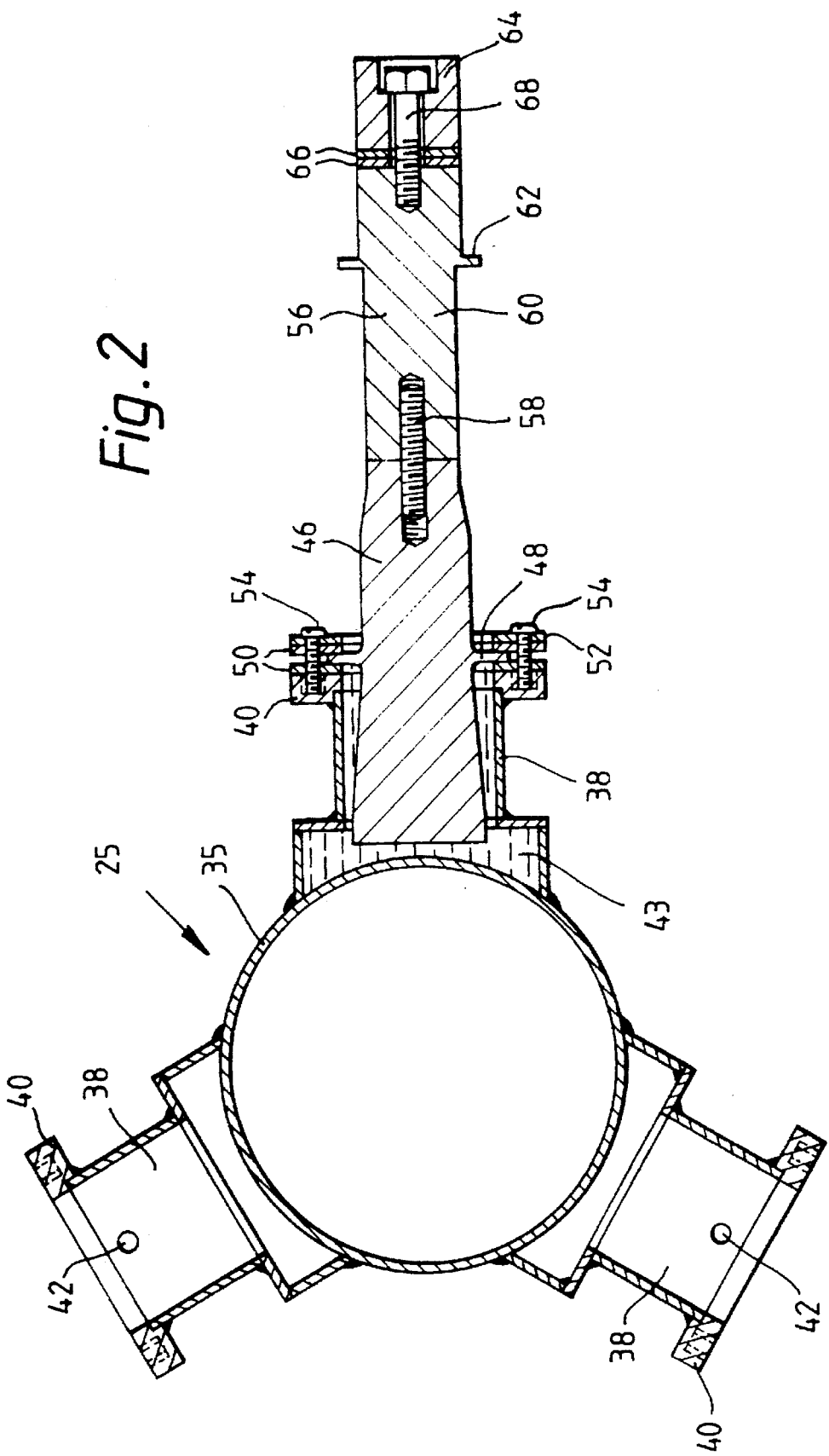
FIG. 2 shows a cross-sectional view of a sonochemical apparatus for use in the plant of FIG. 1.
Figure 3:
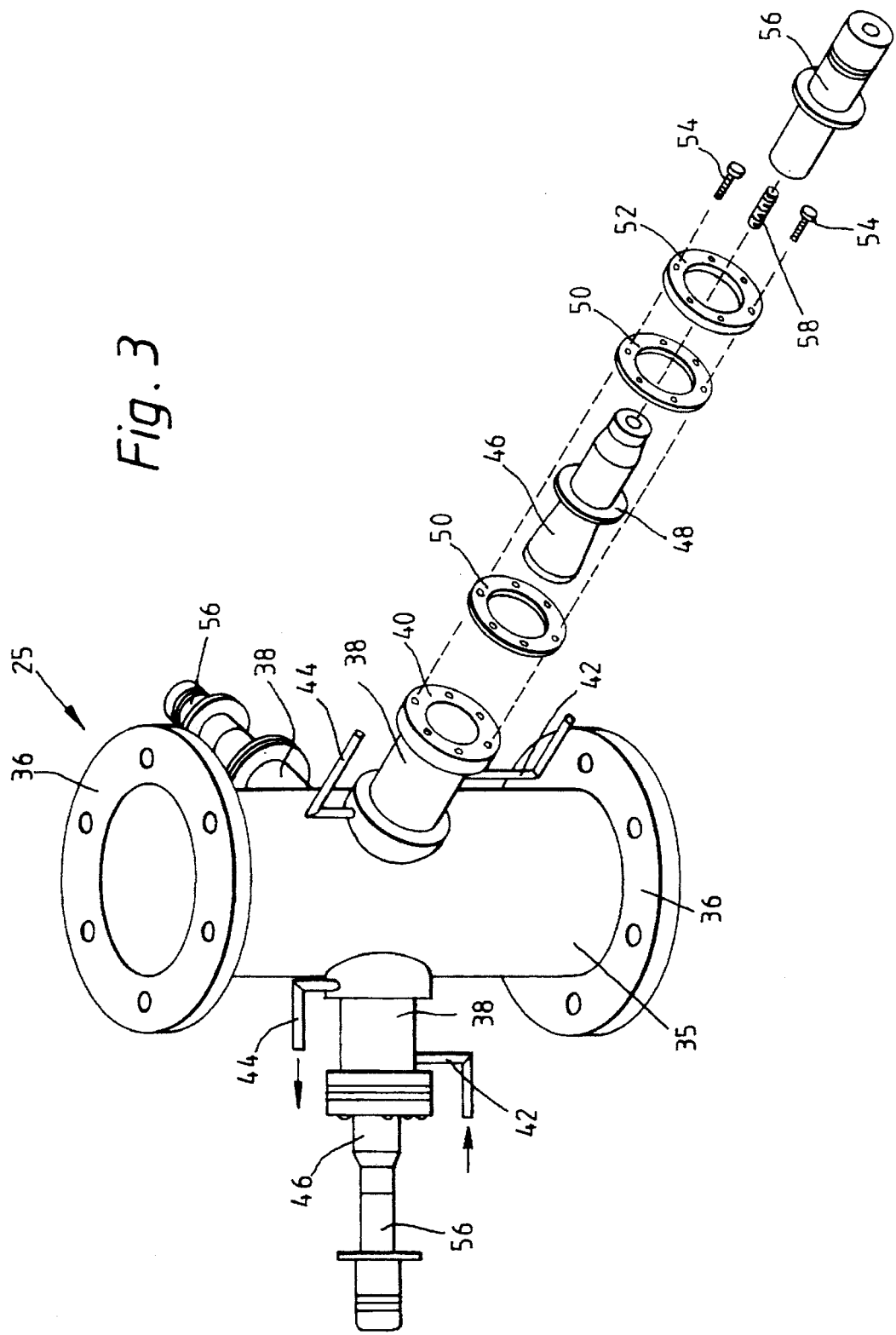
FIG. 3 shows a perspective view, partly exploded, of the sonochemical apparatus of FIG. 2.

Referring now to FIG. 2 there is shown a cross-sectional view of a sonochemical apparatus 25 suitable for use in the loop 20 of FIG. 1. The apparatus 25 includes a length of stainless steel tube 35 of wall thickness 2.5 mm and bore diameter 125 mm, with a flange 36 (shown in FIG. 3) at each end so it can be connected into the loop 20. Three stepped stainless steel collars 38 of wall thickness 3 mm are welded to the outside of the tube 35 in a common plane, equally spaced around it; at the outer end of each is a mounting flange 40. Referring also to FIG. 3, each collar 38 is provided with inlet ports 42 and outlet ports 44 for circulating olive oil 43 through the collar 38 and a heat exchanger 29 as described above in relation to FIG. 1. Each collar 38 encloses one end of a generally cylindrical titanium alloy half-wavelength coupler 46 (only one being shown in FIG. 2) which has a nodal flange 48. The coupler 46 is held coaxial with the collar 38 with its end face 6 mm from the outside of the wall of the tube 35 by clamping the outer edge of the nodal flange 48 between two silicone rubber gaskets 50 held between the mounting flange 40 and a steel clamping ring 52 and secured by screws 54 (only two are shown).

To the other end of the coupler 46 is firmly fixed a transducer assembly 56 by means of a short threaded stud 58 which engages in correspondingly threaded holes in the coupler 46 and the assembly 56. The abutting faces are smooth and flat to maximize the coupling of ultrasonic waves from the assembly 56 into the coupler 46. The resonant frequency of the assembly 56 is 20 kHz, and the coupler 46 is half a wavelength long at that frequency, so that the flange 48 is at a position which in operation is a node of displacement. The end of the coupler 46 adjacent to the assembly 56 is 33 mm in diameter (the same diameter as the adjacent end of the assembly 56), but the other end is of diameter 50 mm in order to couple ultrasound more efficiently into the olive oil 43. At each end is a short cylindrical portion; between the wider end portion and the flange 48 the coupler 46 tapers uniformly; the coupler 46 has the same diameter at each side of the flange 48 and on each side of the flange 48 is a fillet; and between the flange 48 and the narrower end portion is a cylindrical portion and then a short tapered portion.

The transducer assembly 56 comprises a generally cylindrical titanium alloy coupling block 60 (which also defines a nodal flange 62) and a cylindrical titanium alloy backing block 64, between which are sandwiched two annular discs 66 of pzt (lead zirconate titanate) piezo-electric material polarized in opposite directions. The assembly 56 is held together by an 8 mm diameter bolt 68 which is tight enough to ensure the discs 66 remain in compression in operation. The dimensions and masses are such that the assembly 56 resonates at about 20 kHz. Such an assembly is available from Sonic Systems, Isle Brewers, Taunton, Somerset.

In operation of the apparatus 25 each transducer assembly 56 is connected to a respective 20 kHz signal generator (not shown), the electrical signals being supplied to the adjacent faces of the discs 66 and the outer faces being earthed. Typically each generator might provide an electrical power of about 250 W to the assembly 56. Olive oil 43 is circulated through the collars 38 and the heat exchanger 29 to prevent overheating. Due to energy losses, principally due to reflection at the interface between the olive oil 43 and the tube 35, the sonic power to which the liquid inside the tube 35 is subjected is about 100 W from each assembly 56. Where the liquid is water, cavitation has been found to occur over a length of the tube 35 of about 300 mm, so the treated volume is about 3.6 liters.

We claim:

1. An apparatus for subjecting a liquid to an ultrasonic intensity comprising:

(a) a cylindrical tube defining a chamber for the liquid;

(b) a plurality of collars fixed at one of their ends in fluid-tight manner to the outside surface of the wall of the tube so as to project outwardly from the wall, equally spaced around the tube and lying in a common plane;

(c) a plurality of transducer assemblies adapted when energised to generate ultrasonic waves at an operating frequency;

(d) a plurality of ultrasonic couplers adapted to resonate at the operating frequency, each coupler having a nodal flange by which it is fixed to the other end of a respective collar remote from the wall so part of the coupler is enclosed by the collar, each transducer assembly being fixed to the end of the respective coupler which is located outside the liquid-filled collar, the collar being of such dimensions that within the collar there is a gap between the end of the coupler and the nearest part of the wall of width less than 10 mm, and a gap between the sides of the coupler and the collar of width between 2 mm and 10 mm;

(e) a buffer liquid, with a cavitation threshold above that of the liquid in the chamber, filling the collar and so occupying the gaps between the coupler and both the collar and the wall; and (f) means to circulate the buffer liquid.

2. An apparatus for subjecting a liquid to an ultrasonic intensity comprising means defining a chamber for the liquid, at least one collar fixed at one of its ends in a fluid-tight manner to the outside surface of a wall of the chamber so as to project outwardly from the wall, each collar enclosing part of an ultrasonic coupler adapted to resonate at an operating frequency and having a nodal flange by which it is fixed to the other end of the collar remote from the wall such that there is a gap between the sides of the coupler and the collar, and a gap between the end of the coupler in the collar and the wall, a buffer liquid with a cavitation threshold above that of the liquid in the chamber filling the collar and so occupying the gaps between the coupler and both the collar and the wall, a transducer assembly fixed to the end of the coupler which is located outside the liquid-filled collar and adapted when energized to generate ultrasonic waves of the operating frequency in the coupler, and means to circulate the buffer liquid and to cool it.

* * * * *